Dec. 16, 1941.        W. B. LERCH ET AL        2,266,221
PROCESS OF MAKING THIOUREA
Original Filed June 20, 1938
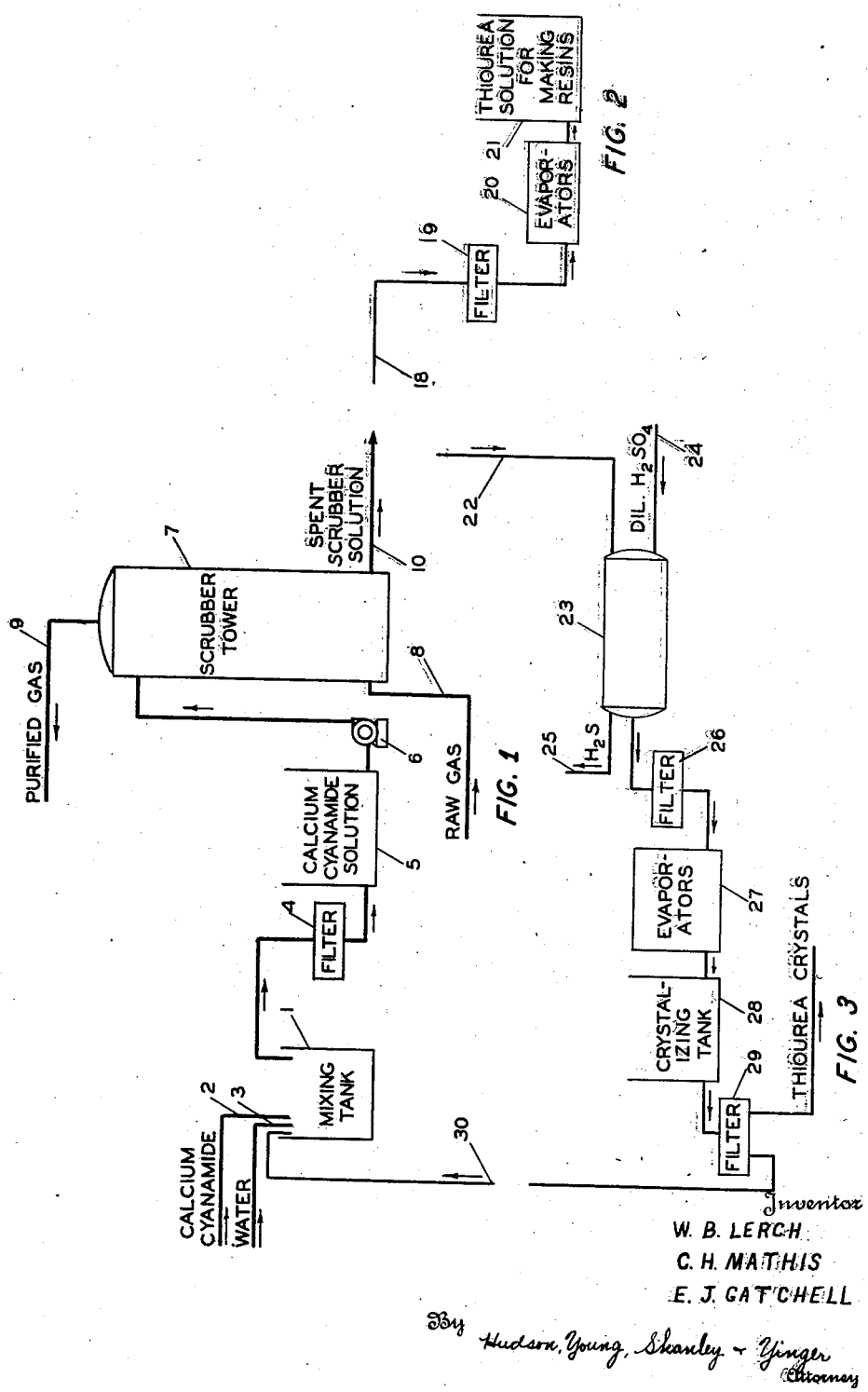
Inventor
W. B. LERCH
C. H. MATHIS
E. J. GATCHELL
By Hudson, Young, Skanley & Yinger
Attorney Patented Dec. 16, 1941

2,266,221

UNITED STATES PATENT OFFICE 2,266,221

PROCESS OF MAKING THIOUREA

William Bruce Lerch, Clyde H. Mathis, and Eugene J. Gatchell, Bartlesville, Okla., assignors to Phillips Petroleum Company, a corporation of Delaware Original application June 20, 1938, Serial No. 214,834. Divided and this application June 20, 1940, Serial No. 341,562

2 Claims. (Cl. 260—552)

The invention relates to the process of using the hydrogen sulfide and objectionable sulphur compounds present in the gaseous or liquid hydrocarbons to react with a cyanamide compound to form thiourea and isothiourea ethers.

Thiourea has chemical properties which make it attractive for many industrial applications, but its high price has made its use prohibitive except when an expensive material is justified.

Thiourea has been made by heating ammonium thiocyanate, but this method is quite expensive because of low yields and the expense of ammonium thiocyanate. Thiourea has also been prepared from the reaction of basic sulfides such as ammonium sulfide on cyanamide and by the reaction of hydrogen sulfide on calcium cyanamide using refrigeration to maintain low temperatures. These methods and others have failed to make thiourea available at a low price.

This invention discloses a method of preparing thiourea of high quality at a low cost. The thiourea is prepared as a result of the sweetening of "sour" natural gas by a calcium cyanamide solution as described in applicants' copending application, Serial No. 214,834 filed June 20, 1938. The hydrogen sulfide contained in the natural gas reacts with the calcium cyanamide solution to form thiourea. The reaction between hydrogen sulfide and calcium cyanamide is exothermic and the solution becomes sufficiently warm to cause side reactions. This is undesirable and must be prevented. Previous patents have suggested the use of ice or other cooling methods. Refrigeration increases the cost of the operation and makes a more complicated plant.

In this invention no cooling is necessary because the volume of inert natural gas dilutes the hydrogen sulfide and at the same time carries off any heat of reaction as fast as it is formed. Nitrogen or other gases inert to the chemicals involved in the reaction would have a comparative effect when used as a diluent for the hydrogen sulfide. The mixture of gases represents the chief reason for the success of this process over others and is novel to the art of manufacturing thiourea.

An object of the invention is to provide a process in which, if desired, the spent agent or agents employed to sweeten sour oils, distillates or gases may be processed to secure a thiourea solution.

A further object of the invention is to provide a process in which, if desired, the spent agent or agents employed to sweeten sour oils, distillates or gases may be acidified and then processed to secure thiourea crystals.

Other objects and advantages along with the foregoing will be apparent to those skilled in the art to which the present invention pertains from the disclosure thereof hereinafter set forth, and are attained by the invention described in detail below.

This application is a division of our co-pending application, Serial No. 214,834, filed June 20, 1938, now U. S. Patent 2,235,936.

In the accompanying drawing we have shown diagrammatically certain kinds of apparatus which may be used in carrying out the treatment, but it is to be understood that the invention is in no sense restricted to those particular types of apparatus.

Figure 1 shows a diagrammatic view of the sweetening process,

Figure 2 shows a diagrammatic view of the process wherein the sweetening process is connected with apparatus to process the spent agent or agents so as to recover a thiourea solution, Figure 3 shows a diagrammatic view of another modification of the process wherein the sweetening process is connected with apparatus to process the spent agent or agents with an acid so as to recover thiourea crystals and a filtrate.

Calcium cyanamide or any cyanamide compound will remove mercaptans from hydrocarbons as well as removing the hydrogen sulfide. The cyanamide and mercaptan react to form isothiourea ethers which are quite insoluble in the solvents present.

Referring more particularly to Figure 1, which constitutes a proposed showing of apparatus for the preferred modification of the process for the removal of hydrogen sulfide from gases by the use of commercial calcium cyanamide, I represents a mixing tank wherein calcium cyanamide from line 2 is mixed or dissolved in water from line 3. It is essential that the temperature in the mixing tank be kept below 25° C. throughout the mixing. From the mixing tank I, the suspension passes through the filter 4 where it is filtered and the filtrate containing the calcium cyanamide is fed continuously into the top of the scrubber tower 7 from storage tank 5 by means of pump 6. It is to be noted that sulphur, thiourea, ammonia or other amines may be added as a catalyst to the calcium cyanamide solution when the same is in the storage tank 5. The raw gas enters the scrubber tower 7 at the bottom thereof through the line 8 and the purified product leaves at the top through line 9. The raw gas, in passing up through the scrubber tower 7, is continuously being subjected to the calcium cyanamide solution, and the hydrogen sulfide reacts with the calcium cyanamide solution to change the composition of the same and allow a purified product to leave the scrubber tower through the line 9. The spent scrubber solution leaves the bottom of the tower 7 through the line 10. This spent scrubber solution contains thiourea, calcium sulfhydrate and a precipitate of calcium carbonate formed from the calcium cyanamide and carbon dioxide contained in most natural gas.

Referring now to Figure 2 which shows a modification of the previously described apparatus, the spent scrubber solution may now be taken through line 18 with line 11 completely closed, or the solution may be divided in any proportions desired and passed through both lines 11 and 18. The spent scrubber solution passing through line 18 passes to filter 19 where the solution is filtered and thence to evaporator 20 where some of the liquid is evaporated off. The steps under this process are carried out preferably under reduced pressure and the evaporation proceeds until the thiourea reaches concentration suitable for use in making synthetic resins and is stored in tank 21. If the line 11 is completely closed, by this method there is no recycling of the spent material, instead it is used as a raw material for the manufacture of resins or other purposes for which it is applicable.

Referring to the process shown in Figure 3, the spent scrubber solution may pass from line 10 to line 22 or the solution may be divided in any proportions desired between the other two lines, and passed to the mixer tank 23. Connecting into tank 23 is the line 24 which delivers a dilute sulphuric acid or any other acid to the tank and mixes the same with the spent scrubber solution to acidify the same and the whole is cooled. If desired, in place of the dilute sulphuric acid, the carbon dioxide from the flue gases may be used where such is available. Hydrogen sulfide is driven off from the spent scrubber solution and the residue goes to the filter 26. The filtrate is evaporated in evaporator 27 from where the fluid passes to crystallizing tank 28. The solution then passes to filter 29 where the thiourea crystals are removed from the filter and the filtrate is pumped back to mixing tank 1 through pipe 30 where it dissolves more crude calcium cyanamide or if desired may be discarded.

This process of removing hydrogen sulfide is continuous by any of the methods described. It may be a method of removing hydrogen sulfide in which only enough fresh chemical for makeup is required, or it may be a method of removing hydrogen sulfide from gas which yields a source of thiourea for industrial purposes. It is to be understood that while sour gas has been used to illustrate the apparatus shown in the drawing, similar setups could be used for sweetening other sour hydrocarbons and it is not to be understood that the process is limited only to gas.

It is not essential to have a complete plant as just described but a suspension of calcium cyanamide in a tower equipped with proper agitation affords an efficient method of hydrogen sulfide removal, however, the recovery of thiourea is more difficult. Calcium cyanamide, for instance, may be used dry, as a paste, or a suspension in a solvent such as water to remove hydrogen sulfide from hydrocarbons such as natural gas, coal gas, producer gas, water gas, refinery still gas, or liquid hydrocarbons such as crude oil or the fractions obtained therefrom or any gases or liquid materials containing hydrogen sulfide.

We prefer to use calcium cyanamide because of its availability and low cost but do not limit ourselves to this compound since cyanamide, sodium cyanamide or other cyanamide salts may be used equally as well and are to be considered within the scope of this invention. In practice the gas or hydrocarbon vapor, for instance natural gas, containing hydrogen sulfide is conducted through a bed of dry calcium cyanamide or is scrubbed with a solution or suspension of calcium cyanamide in water or other solvent in the conventional countercurrent type of scrubber. The theoretical reaction involved is illustrated in the following chemical equation:

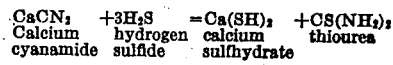

According to this equation, one weight equivalent, for instance 80 pounds, of calcium cyanamide should react with three weight equivalents or 102 pounds of hydrogen sulfide to form as one of the products of the reaction one weight equivalent or 76 pounds of thiourea which may be separated as a valuable by-product. In practice, it has been found that a much greater weight of hydrogen sulfide is required to react with the same weight of calcium cyanamide which would indicate that the reaction is more complex than that indicated by the chemical equation as given.

If desired, it is not necessary to have the calcium cyanamide in solution with water but the same may be used in a dry state. Dry granular calcium cyanamide may be packed in an upright cylindrical tank which should be equipped with coils cooled by circulating water to maintain the temperature below 100° F. and the gas containing hydrogen sulfide is passed upwardly through the tank. The gas contacts the calcium cyanamide and the hydrogen sulfide is absorbed rapidly with the process continuing until the effluent gas shows traces of hydrogen sulfide when the flow of gas is switched to another similar absorber while the spent calcium cyanamide in the first cylinder is extracted with solvents to remove the thiourea after which the absorber is cleaned and recharged with a fresh batch of calcium cyanamide and is ready for a new cycle of operation. In treating gasoline or kerosene to remove the sulphur compounds, this treatment may be applied by passing the vapors over a bed of calcium cyanamide or cyanamide.

From the foregoing it is believed that the steps and advantages of the process may be readily understood by those skilled in the art and it is manifest that changes may be made in the details disclosed without departing from the spirit of the invention, as expressed in the claims. In the appended claims, we mean the term "hydrocarbons" to generically define gasoline, kerosene, and other petroleum distillates and oils.

Having thus described our invention, what we claim is:

1. The process of making thiourea which comprises treating hydrocarbon gas containing hydrogen sulfide present in the hydrocarbon gas normally as an impurity, with a solution of calcium cyanamide and water in a scrubber tower and then taking the spent scrubber solution from the scrubber tower through a filter and evaporator to remove the thiourea therefrom.

2. The process of making thiourea which comprises treating hydrocarbon gas containing hydrogen sulfide present in the hydrocarbon gas normally as an impurity, with a solution of calcium cyanamide and water in a scrubber tower, neutralizing the spent scrubber solution with a dilute acid, then filtering and evaporating the residue and allowing the same to crystallize to remove the thiourea.

WILLIAM BRUCE LERCH.
CLYDE H. MATHIS.
EUGENE J. GATCHELL.